(12) United States Patent
Chien et al.

(10) Patent No.: US 11,425,400 B2
(45) Date of Patent: Aug. 23, 2022

(54) ADAPTIVE SCALING LIST CONTROL FOR VIDEO CODING

(71) Applicant: QUALCOMM Incorporated, San Diego, CA (US)

(72) Inventors: Wei-Jung Chien, San Diego, CA (US); Han Huang, San Diego, CA (US); Yung-Hsuan Chao, San Diego, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/225,643

(22) Filed: Apr. 8, 2021

(65) Prior Publication Data

US 2021/0329275 A1    Oct. 21, 2021

Related U.S. Application Data

(60) Provisional application No. 63/012,794, filed on Apr. 20, 2020.

(51) Int. Cl.
*H04N 19/30* (2014.01)
*H04N 19/186* (2014.01)
*H04N 19/176* (2014.01)
*H04N 19/70* (2014.01)

(52) U.S. Cl.
CPC .......... *H04N 19/30* (2014.11); *H04N 19/176* (2014.11); *H04N 19/186* (2014.11); *H04N 19/70* (2014.11)

(58) Field of Classification Search
CPC .... H04N 19/30; H04N 19/176; H04N 19/186; H04N 19/70
See application file for complete search history.

(56) References Cited

U.S. PATENT DOCUMENTS

2021/0092408 A1\*   3/2021  Ramasubramonian ..................... H04N 19/159

FOREIGN PATENT DOCUMENTS

WO    WO-2021209331 A  * 10/2021

OTHER PUBLICATIONS

Bross B., et al., "Versatile Video Coding (Draft 8)", Joint Video Experts Team (JVET) of ITU-T SG 16 WP 3 and ISO/IEC JTC 1/SC 29/WG 11, 17th Meeting: Brussels, BE, Jan. 7, 2020-Jan. 17, 2020, Document: JVET-Q2001-vE, No. JVET-Q2001; m52905, Jan. 22, 2020 (Jan. 22, 2020), XP030224288, 515 pages, Retrieved from the Internet: URL: http://phenix.int-evry.fr/jvet/doc_end_user/documents/17_Brussels/wg11/JVET-Q2001-v9.zip JVET-Q2001-v9.docx [retrieved on Jan. 22, 2020].

(Continued)

*Primary Examiner* — Jae N Noh
(74) *Attorney, Agent, or Firm* — Shumaker & Sieffert, P.A.

(57) ABSTRACT

An example method includes decoding, from a coded video bitstream, an explicitly defined scaling list; determining, based on values of one or more syntax elements decoded from a sequence parameter set (SPS) of the coded video bitstream, a set of block types to which the explicitly defined scaling list is eligible for application; and applying the explicitly defined scaling list to a block included in the set of block types.

24 Claims, 7 Drawing Sheets

(56) References Cited

OTHER PUBLICATIONS

Hashimoto T., et al., "AHG15: Signaling Scaling Matrix for LFNST Case", 16th JVET Meeting, Oct. 1, 2019-Oct. 11, 2019, Geneva, CH (The Joint Video Exploration Team of ISO/IEC JTC1/SC29/WG11 and ITU-T SG.16 WP 3), No. JVET-P0293_WD-v2, m50258, Sep. 27, 2019 (Sep. 27, 2019), XP030216842, 16 pages, Retrieved from the Internet: URL:http://phenix.int-evry.fr/jvet/doc_end_user/documents/16_Geneva/wg11/JVET-P0293-v2.zip JVET-P0293-v2/JVET-P0293_WD-v2.docx [retrieved on Sep. 27, 2019], Section 1.
International Search Report and Written Opinion—PCT/US2021/026578—ISA/EPO—dated Jun. 22, 2021.
ITU-T H.265: "Series H: Audiovisual and Multimedia Systems Infrastructure of Audiovisual Services—Coding of Moving Video High Efficiency Video Coding", The International Telecommunication Union, Jun. 2019, 696 Pages.
Iwamura S., et al., "Scaling List for Adaptive Colour Transform", JVET-R0380-v3, Joint Video Experts Team (JVET) of ITU-T SG 16 WP 3 and ISO/IEC JTC 1/SC 29/WG 11, 18th Meeting: by Teleconference, Apr. 15-24, 2020, pp. 1-5.
Paluri (LGE) S., et al., "AHG17: APS Support for Default and User Defined Scaling Matrices", 15th JVET Meeting, Jul. 3, 2019-Jul. 12, 2019, Gothenburg, SE (The Joint Video Exploration Team of ISO/IEC JTC1/SC29/WG11 and ITU-TSG.16 WP 3), No. JVET-O0299, m48409, Jul. 6, 2019 (Jul. 6, 2019), XP030219183, 5 pages, Retrieved from the Internet: URL:http://phenix.int-evry.fr/jvet/doc_end_user/documents/15_Gothenburg/wg11/JVET-O0299-v2.zip JVET-O0299/JVET-O0299.docx [retrieved on Jul. 6, 2019], Sections 1, 2.
Ramasubramonian A.K., et al., "AHG15: Scaling Matrices for LFNST-Coded Blocks", JVET-P0365-v2, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-4.
Wang Y-K., (Bytedance) et al., "AHG9: Signalling of Scaling List Control", 130th MPEG Meeting, 18th JVET Meeting, Apr. 15, 2020-Apr. 24, 2020, Alpbach, (Motion Picture Expert Group or Joint Video Experts Team (JVET) of ITU-T SG 16 WP 3 and ISO/IEC JTC1/SC29/WG11), No. m53021, JVET-R0064-v1, Apr. 2, 2020 (Apr. 2, 2020), XP030285796, 4 pages, Retrieved from the Internet: URL:http://phenix.int-evry.fr/mpeg/doc_end_user/documents/130 Alpbach/wg11/m53021-JVET-R0064-v1-JVET-R0064-v1.zip JVET-R0064-v1.docx [retrieved on Apr. 2, 2020].

* cited by examiner

ADAPTIVE SCALING LIST CONTROL FOR VIDEO CODING

This application claims the benefit of U.S. Provisional Application No. 63/012,794, filed Apr. 20, 2020, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for adaptive scaling list control. A video coder (e.g., a video encoder and/or a video decoder) may apply scaling lists for dequantization. For instance, the video coder may scale transform coefficients of a block of video data using a scaling list. In some examples, the video coder may apply adaptive color transform (ACT). For instance, the video coder may convert a color space of residual signals from a first color space (e.g., RGB) to a second color space (e.g., YCgCo). The combination of applying scaling lists and ACT may present one or more disadvantages. For instance, in general, correlation between residual signals of three components in RGB domain is stronger than that in YCgCo domain, which means that the energy distribution of transform coefficients in RGB and YCgCo domain would be different. Some codecs require that scaling lists are always shared for G and Y, for B and Cg, for R and Co. However, such sharing of scaling lists may cause undesirable behaviour of quantization process. One solution to overcoming such undesirable behaviour is to disable the application of scaling lists to block to which ACT is applied (i.e., ACT blocks). However, this solution may present its own disadvantages. For instance, it may still be desirable to allow the application of some scaling lists to ACT blocks.

In accordance with one or more techniques of this disclosure, a video coder may explicitly signal a set of block types to which a scaling list is eligible for application. For instance, where the video coder determines that a scaling list is not eligible for application to ACT block types (e.g., the set of block types does not include ACT block types), the video coder may not (e.g., may refrain) scale transform coefficients of blocks of video data to which ACT is applied. Where the video coder determines that a scaling list is eligible for application to ACT block types, the video coder may scale transform coefficients of blocks of video data to which ACT is applied using the scaling list. As such, control of the application of scaling lists may be made adaptive. In this way, a video coder may avoid the disadvantages of scaling list sharing while also retaining the ability to apply scaling lists to ACT blocks.

In one example, a method includes decoding, from a coded video bitstream, an explicitly defined scaling list; determining, based on values of one or more syntax elements decoded from a sequence parameter set (SPS) of the coded video bitstream, a set of block types to which the explicitly defined scaling list is eligible for application; and applying the explicitly defined scaling list to a block included in the set of block types In another example, a device includes a memory configured to store at least a portion of a video bitstream; and processing circuitry configured to decode, from the coded video bitstream, an explicitly defined scaling list; determine, based on values of one or more syntax elements decoded from a SPS of the coded video bitstream, a set of block types to which the explicitly defined scaling list is eligible for application; and apply the explicitly defined scaling list to a block included in the set of block types.

In another example, a method includes encoding, in a coded video bitstream, an explicitly defined scaling list; encoding, in a SPS of the coded video bitstream, one or more syntax elements that specify a set of block types to which the explicitly defined scaling list is eligible for application; and applying the explicitly defined scaling list to a block included in the set of block types.

In another example, a device includes a memory configured to store at least a portion of a video bitstream; and processing circuitry configured to encode, in the coded video bitstream, an explicitly defined scaling list; encode in a SPS of the coded video bitstream, one or more syntax elements that specify a set of block types to which the explicitly defined scaling list is eligible for application; and apply the explicitly defined scaling list to a block included in the set of block types.

In another example, a device includes means for means for decoding, from a coded video bitstream, an explicitly defined scaling list; means for determining, based on values of one or more syntax elements decoded from a SPS of the coded video bitstream, a set of block types to which the explicitly defined scaling list is eligible for application; and means for applying the explicitly defined scaling list to a block included in the set of block types.

In another example, a device includes means for means for encoding, in a coded video bitstream, an explicitly defined scaling list; means for encoding, in a SPS of the coded video bitstream, one or more syntax elements that specify a set of block types to which the explicitly defined scaling list is eligible for application; and means for applying the explicitly defined scaling list to a block included in the set of block types.

In another example, a computer-readable storage medium stores instructions that, when executed, cause one or more processors to decode, from a coded video bitstream, an explicitly defined scaling list; determine, based on values of one or more syntax elements decoded from a SPS of the coded video bitstream, a set of block types to which the explicitly defined scaling list is eligible for application; and apply the explicitly defined scaling list to a block included in the set of block types.

In another example, a computer-readable storage medium stores instructions that, when executed, cause one or more processors to encode, in a coded video bitstream, an explicitly defined scaling list; encode in a SPS of the coded video bitstream, one or more syntax elements that specify a set of block types to which the explicitly defined scaling list is eligible for application; and apply the explicitly defined scaling list to a block included in the set of block types.

The details of one or more examples are set forth in the accompanying drawings and the description below. Other features, objects, and advantages will be apparent from the description, drawings, and claims.

DETAILED DESCRIPTION

Figure 1:
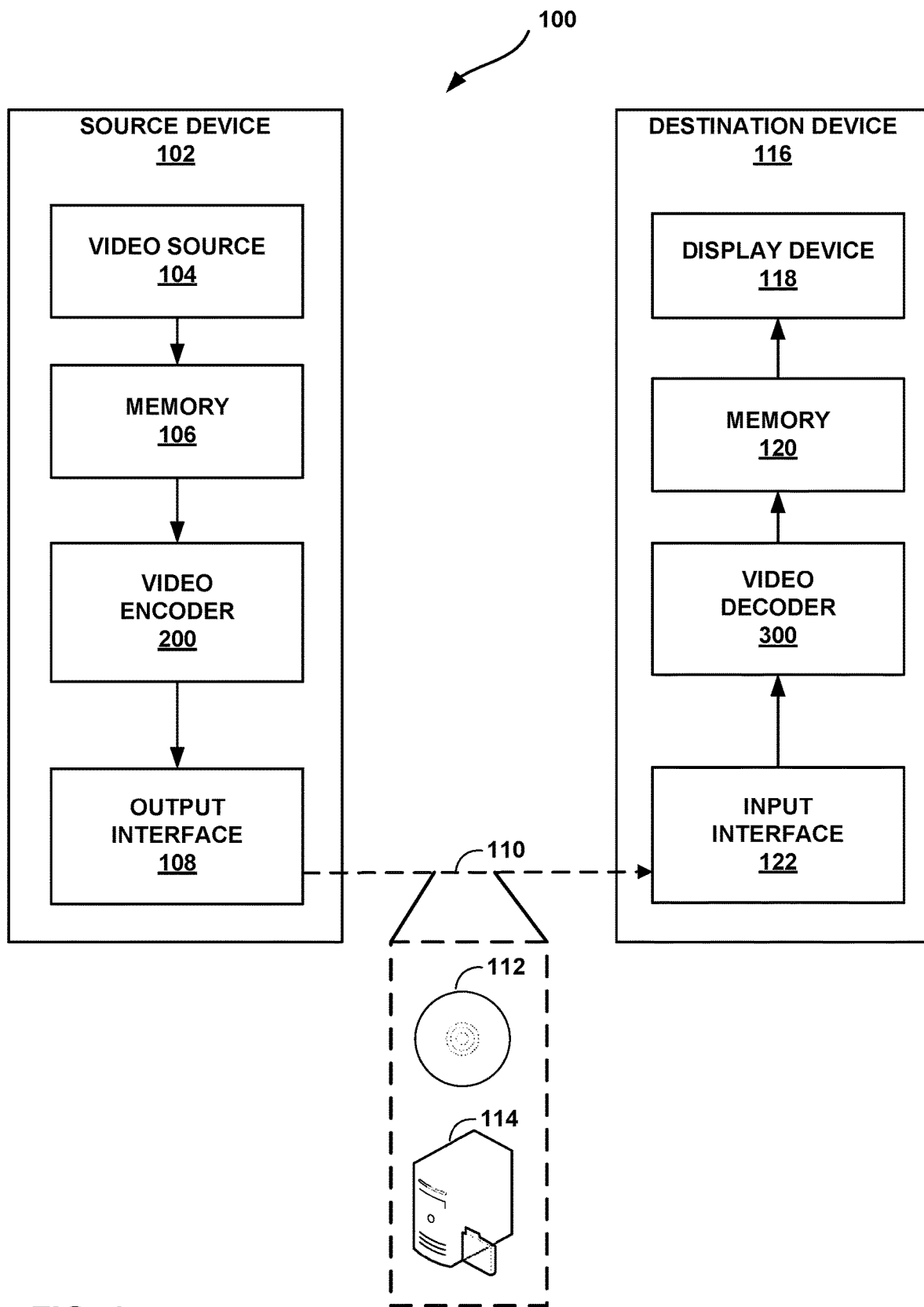
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply techniques for adaptive scaling list control. Source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for adaptive scaling list control. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may demodulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross et al. "Versatile Video Coding (Draft 8)," Joint Video Experts Team (JVET) of ITU-T SG 16 WP 3 and ISO/IEC JTC 1/SC 29/WG 11, 17$^{th}$ Meeting: Brussels, BE, 7-17 Jan. 2020, JVET-Q2001-vE (hereinafter "VVC Draft 8"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In VVC Draft 8, user defined scaling lists may be applied for dequantization.

Also in VVC Draft 8, adaptive colour transform (ACT) may be applied for 4:4:4 RGB video signals. ACT may be controlled at the CU level flag (cu_act_enabled_flag). When a video coder (e.g., video encoder 200 and/or video decoder 300) applies ACT to the current CU, the video coder may convert a colour space of the residual signals from RGB (GBR) to YCgCo. As suggested in Iwamura, et al. "Scaling list for adaptive colour transform," Joint Video Experts Team (JVET) of ITU-T SG 16 WP 3 and ISO/IEC JTC 1/SC 29/WG 11, 18$^h$ Meeting: by teleconference, 15-24 Apr. 2020, JVET-R0380v3 (hereinafter "JVET-R0380"), in general, correlation between residual signals of three components in RGB domain is stronger than that in YCgCo domain, which means that the energy distribution of transform coefficients in RGB and YCgCo domain would be different. In VVC Draft 8, the scaling lists are always shared for G and Y, for B and Cg, for R and Co, which may cause undesirable behaviour of a quantization process. JVET-R0380 proposes to disable a scaling matrix for the block coded with ACT. However, there may be cases in which use of the scaling list may be desired for ACT coded block instead of a non-ACT coded block.

This disclosure describes techniques for adaptive scaling list control for adaptive color transform (ACT). A video coder may receive a user specified variable ScalingListType that indicates to which type of coded block the scaling list may be applied. As one example, the variable ScalingListType being equal to a first value (e.g., SCALING_LIST_TYPE_ACT) may indicate that the scaling list may be only applied to ACT coded block and is not applied to other blocks. As another example, the variable ScalingListType being equal to a second value (e.g., SCALING_LIST_TYPE_OTHER) may indicate that the scaling list is not applied to ACT coded block but may be applied to other block. Other signaling techniques may be used for the same purpose (e.g., to indicate to which type of coded block the scaling list may be applied).

The above techniques may be extended for controling the scaling list for Low Frequency Non-Separable Transform (LFNST) coded blocks. As one example, the variable ScalingListType being equal to a first value (e.g., SCALING_LIST_TYPE_ACT) may indicate that the scaling list may be only applied to ACT coded block and is not applied to other blocks. As another example, the variable ScalingListType being equal to a second value (e.g., SCALING_LIST_TYPE_LFNST) may indicate that the scaling list is only applied to LFNST coded block and is not applied to other blocks. As another example, the variable ScalingListType being equal to a third value (e.g., SCALING_LIST_TYPE_OTHER) may indicate that the scaling list is not applied to ACT coded block and is not applied to LFNST coded block but may be applied to other block.

A video coder may signal the value of the variable ScalingListType in any parameter set or header structure. For instance, a syntax element representing the value of ScalingListType may be signalled in a sequence parameter set (SPS), a picture parameter set (PPS), a picture header (PH), a slice header (SH), an adaptive paramter set (APS), or any other such strucutre. The video coder may apply some constrains to signlling of ScalingListType. As one example, if ACT is not enabled (e.g., if cu_act_enabled_flag indicates that ACT is not enabled), the video coder may infer the value of ScalingListType to be not equal to SCALING_LIST_TYPE_ACT. As another example, if LFNST is not enabled, the video coder may infer the value of ScalingListType to be not equal to SCALING_LIST_TYPE_LFNST.

It is noted that the determination of whether to apply a scaling list may also be controlled by other high level syntax elements, for example, on/off control at a sequence parameter set (SPS) and/or picture header (PH).

In accordance with the techniques of this disclosure, a video coder may obtain a scaling list (e.g., encode or decode one or more syntax elements that represent an explicit scaling list); code, via a coded video bitstream, and a syntax element specifying a set of block types to which the scaling list may be applied.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
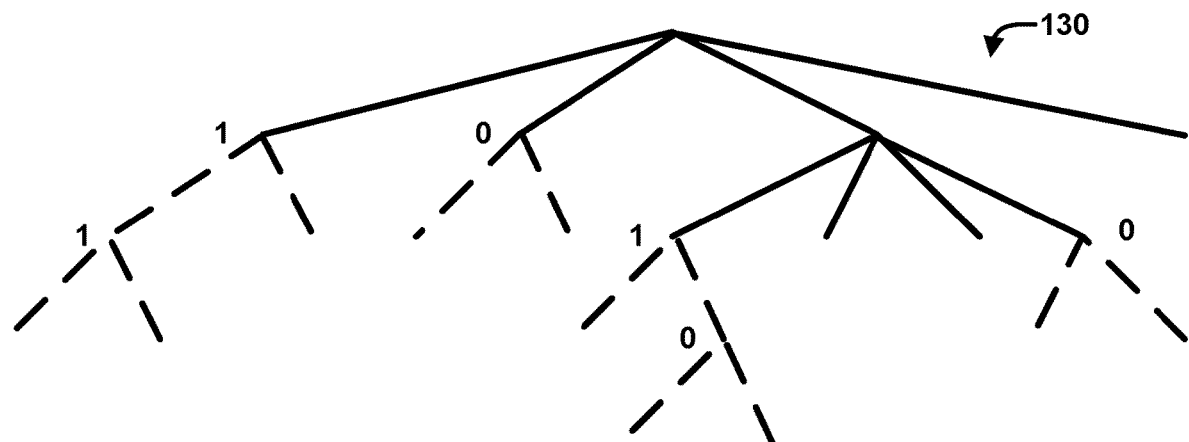
FIGS. 2A and 2B are conceptual diagrams illustrating an example quadtree binary tree (QTBT) structure, and a corresponding coding tree unit (CTU).
Figure 2B:
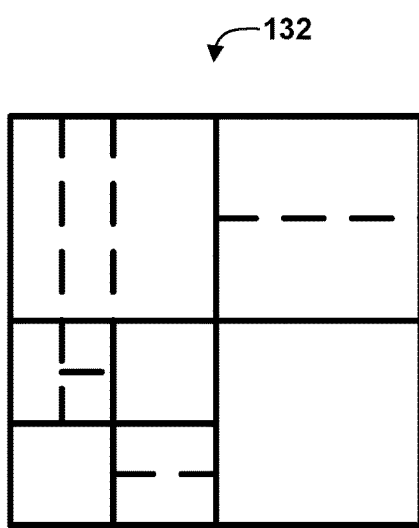

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies that no further vertical splitting is permitted. Similarly, a binary tree node having a height equal to MinBTSize implies that no further horizontal splitting is permitted for that binary tree node. As noted above, leaf nodes of the binary tree are referred to as CUs, and are further processed according to prediction and transform without further partitioning.

Video encoder 200 and video decoder 300 may be configured to process quantization parameters. QP values are used to determine the step size to be used for quantizing/inverse-quantizing the coefficients. QP values are specified in the range of −QpBdOffset to 63, inclusive, where 63 is the maximum QP value. QpBdOffset is specified as a fixed value for a particular bit depth, derived as 6*(bitDepth−8). The QP prime value, calculated by adding QpBdOffset to the specified QP value, is used to derive the actual step size. For ease of description, the QP and QP prime value may be used interchangeably in the rest of the description with the understanding that the QP value may be only used in most QP derivation processes, and the QP prime value may be only used at the final stage just before determining the step size. A change of QP value by 1 roughly indicates a change in the step size by 12%, and a change of QP value by 6 corresponds to changing the step size by a factor of 2. A higher quantization parameter value means a larger quantization step size and more coarse representation of the coefficients being quantized.

Video encoder 200 and video decoder 300 may be configured to process quantization and scaling matrices. In video coding, the residual obtained after the prediction operation is transformed using DCT2 or other transform operations. Subsequently, the transform coefficients are quantized, and the quantized coefficients are entropy coded.

The quantization process is controlled by two factors: quantization parameter and scaling matrices. A description of the quantization parameters is described above. At the decoder (e.g., video decoder 300), a scale factor corresponding to the quantization parameter is determined. This scale factor is applied as follows:

$$\text{levelScale}[\ ][qP \% 6]) << (qP/6)$$

where qP is the quantization parameter, levelScale[ ][ ] is array defined as below The list levelScale[ ][ ] is specified as levelScale[j][k]= {{40, 45, 51, 57, 64, 72}, {57, 64, 72, 80, 90, 102} } with j=0 . . . 1, k=0 . . . 5.

A QP difference of six results in a bit-shift of 1, and hence the scale associated with the QP is applied by a shift of (qP/6) and a scale calculated using qp % 6.

In addition, a scaling parameter is applied for each coefficient. The scaling parameter may be different for different coefficients. The scaling factor associated with the scaling matrices is derived as follows:

The intermediate scaling factor m[x][y] is derived as follows:
If one or more of the following conditions are true, m[x][y] is set equal to 16:
sps_scaling_list_enabled_flag is equal to 0.
transform_skip_flag[xTbY][yTbY] is equal to 1.

Otherwise, the following applies:

$m[x][y]$=ScalingFactor[Log 2(nTbW)][Log 2(nTbH)][matrixId][x][y], with matrixId as specified in Table 7-5     (8-958)

The final scaling factor used in the inverse quantization is obtained by multiplying the two scaling terms (from QP and scaling matrix) as follows:
If dep_quant_enabled_flag is equal to 1, the following applies:

$ls[x][y]$=($m[x][y]$ *levelScale[rectNonTsFlag][(qP+1) % 6])<<((qP+1)/6)     (8-959)

Otherwise (dep_quant_enabled_flag is equal to 0), the following applies:

$ls[x][y]$=($m[x][y]$ *levelScale[rectNonTsFlag][qP % 6])<<(qP/6)     (8-960)

The scaled transform coefficient is derived as follows, and the result is then sent to the inverse quantization step.
The value dnc[x][y] is derived as follows:

$dnc[x][y]$=($dz[x][y]$ *$ls[x][y]$+bdOffset)>>bdShift     (8-963)

The scaled transform coefficient d[x][y] is derived as follows:

$d[x][y]$=Clip3(CoeffMin,CoeffMax,dnc[x][y])     (8-964)

A description of the signaling and definition of scaling matrices is described next. Video encoder 200 and video decoder 300 may be configured to process scaling matrices.

Scaling matrices are a set of coefficients that are used to scale the transform coefficients. Two uses of scaling matrices are rate control and perceptual quality control. Rate control of video is often performed by adjusting the QP values of blocks. However, the QP difference results in a uniform scale factor applied to the entire block. Scaling matrices may be used for relative control between various coefficients within a transform block. For example, scaling matrices could be defined so that the low frequency coefficients are quantized less than the high frequency coefficients, which may be beneficial for content where there is less high frequency content. For perceptual quality control, scaling matrices may also be used to control the relative accuracy of coefficients within a transform block such that perceptual quality of the video is maintained with lower bitrate. Human Visual System (HVS)-based quantization using scaling matrices can provide better quality video for certain types of content.

The scaling matrices are signaled using scaling lists, which are signaled in the Adaptation parameter set (APS). The scaling list may be enabled or disabled in the SPS. If SPS indicates that scaling lists are enabled, additional signaling in the slice header may be used to switch the scaling matrices on and off.

Scaling matrices are defined for each transform block size and for prediction type of the block. The matrices are derived from scaling lists. The syntax of the scaling lists signaled in the PPS/SPS are as follows:

|  | Descriptor |
|---|---|
| scaling_list_data( ) { | |
|    scaling_matrix_for_lfnst_disabled_flag | u(1) |
|    scaling_list_chroma_present_flag | u(1) |
|    for( id = 0; id < 28; id ++ ) | |
|       matrixSize = (id<2 ) ? 2 : ( ( id < 8 ) ? 4 : 8 ) | |
|       if( scaling_list_chroma_present_flag || ( id % 3 = = 2 ) || ( id = = 27 ) ) { | |
|          scaling_list_copy_mode_flag[ id ] | u(1) |
|          if( !scaling_list_copy_mode_flag[ id ] ) | |
|             scaling_list_pred_mode_flag[ id ] | u(1) |
|          if( ( scaling_list_copy_mode_flag[ id ] || scaling_list_pred_mode_flag[ id ] ) && | |
|             id != 0 && id != 2 && id != 8 ) | |
|             scaling_list_pred_id_delta[ id ] | ue(v) |
|          if( !scaling_list_copy_mode_flag[ id ] ) { | |
|             nextCoef = 0 | |
|             if( id > 13 ) { | |
|                scaling_list_dc_coef[ id − 14 ] | se(v) |
|                nextCoef += scaling_list_dc_coef[ id − 14 ] | |
|             } | |
|             for( i = 0; i < matrixSize * matrixSize; i++ ) { | |
|                x = DiagScanOrder[ 3 ][ 3 ][ i ][ 0 ] | |
|                y = DiagScanOrder[ 3 ][ 3 ][ i ][ 1 ] | |
|                if( ! ( id > 25 && x >= 4 && y >= 4 ) ) { | |
|                   scaling_list_delta_coef[ id ][ i ] | se(v) |
|                   nextCoef += scaling_list_delta_coef[ id ] [ i ] | |
|                } | |
|                ScalingList[ id ][ i ] = nextCoef | |
|             } | |
|          } | |
|       } | |
|    } | |
| } | |

The semantics of the scaling matrices are provided in Section 7.4.3.21 of JVET-Q2001 (e.g., VVC Draft 8), and are reproduced here for reference.

Scaling list data semantics are described below.

scaling_matrix_for_lfnst_disabled_flag equal to 1 specifies that scaling matrices are not applied to blocks coded with LFNST. scaling_matrix_for_lfnst_disabled_flag equal to 0 specifies that the scaling matrices may apply to the blocks coded with LFNST.

scaling_list_chroma_present_flag equal to 1 specifies that chroma scaling lists are present in scaling_list_data( ). scaling_list_chroma_present_flag equal to 0 specifies that chroma scaling lists are not present in scaling_list_data( ). It is a requirement of bitstream conformance that scaling_list_chroma_present_flag, when present, shall be equal to 0 when ChromaArrayType is equal to 0, and shall be equal to 1 when ChromaArrayType is not equal to 0.

scaling_list_copy_mode_flag[id] equal to 1 specifies that the values of the scaling list are the same as the values of a reference scaling list. The reference scaling list is specified by scaling_list_pred_id_delta[id]. scaling_list_copy_mode_flag[id] equal to 0 specifies that scaling_list_pred_mode_flag is present.

scaling_list_pred_mode_flag[id] equal to 1 specifies that the values of the scaling list can be predicted from a reference scaling list. The reference scaling list is specified by scaling_list_pred_id_delta[id]. scaling_list_pred_mode_flag[id] equal to 0 specifies that the values of the scaling list may be explicitly signaled. When not present, the value of scaling_list_pred_mode_flag[id] is inferred to be equal to 0.

scaling_list_pred_id_delta[id] specifies the reference scaling list used to derive the predicted scaling matrix ScalingMatrixPred[id]. When not present, the value of scaling_list_pred_id_delta[id] is inferred to be equal to 0. The value of scaling_list_pred_id_delta[id] shall be in the range of 0 to maxIdDelta with maxIdDelta derived depending on id as follows:

$$\text{maxIdDelta}=(id<2)?\ id:((id<8)?(id-2):(id-8)) \quad (106)$$

The variables refId and matrixSize are derived as follows:

$$\text{refId}=id-\text{scaling\_list\_pred\_id\_delta}[id] \quad (107)$$

$$\text{matrixSize}=(id<2)?\ 2:((id<8)?4:8) \quad (108)$$

The (matrixSize)x(matrixSize) array ScalingMatrixPred[x][y] with x=0 ... matrixSize−1, y=0 ... matrixSize−1 and the variable ScalingMatrixDCPred may be derived as follows:

When both scaling list copy mode flag[id] and scaling_list_pred_mode_flag[id] are equal to 0, all elements of ScalingMatrixPred are set equal to 8, and the value of ScalingMatrixDCPred is set equal to 8.

Otherwise, when scaling_list_pred_id_delta[id] is equal to 0, all elements of ScalingMatrixPred are set equal to 16, and ScalingMatrixDCPred is set equal to 16.

Otherwise (either scaling_list_copy_mode_flag[id] or scaling_list_pred_mode_flag[id] is equal to 1 and scaling_list_pred_id_delta[id] is greater than 0), ScalingMatrixPred is set equal to ScalingMatrixRec[refId], and the following applies for ScalingMatrixDCPred:

If refId is greater than 13, ScalingMatrixDCPred is set equal to ScalingMatrixDCRec[refId−14].

Otherwise (refId is less than or equal to 13), ScalingMatrixDCPred is set equal to ScalingMatrixPred[0][0].

scaling_list_dc_coef[id−14] is used to derive the value of the variable ScalingMatrixDC[id−14] when id is greater than 13 as follows:

$$\text{ScalingMatrixDCRec}[id-14]=(\text{ScalingMatrixDCPred}+\text{scaling\_list\_dc\_coef}[id-14])\ \&\ 255 \quad (109)$$

When not present, the value of scaling_list_dc_coef[id−14] is inferred to be equal to 0. The value of scaling_list_dc_coef[id−14] shall be in the range of −128 to 127, inclusive. The value of ScalingMatrixDCRec[id−14] shall be greater than 0.

scaling_list_delta_coeff id][i] specifies the difference between the current matrix coefficient ScalingList[id][i] and the previous matrix coefficient ScalingList[id][i−1], when scaling_list_copy_mode_flag[id] is equal to 0. The value of scaling_list_delta_coef[id][i] shall be in the range of −128 to 127, inclusive. When scaling_list_copy_mode_flag[id] is equal to 1, all elements of ScalingList[id] are set equal to 0.

The (matrixSize)x(matrixSize) array ScalingMatrixRec[id] is derived as follows:

$$\text{ScalingMatrixRec}[id][x][y]=(\text{ScalingMatrixPred}[x][y]+\text{ScalingList}[id][k])\ \&\ 255 \quad (110)$$

with k=0 ... (matrixSize*matrixSize−1), $$x=\text{DiagScanOrder}[\text{Log 2}(\text{matrixSize})][\text{Log 2}(\text{matrixSize})][k][0],\ \text{and}$$

$$y=\text{DiagScanOrder}[\text{Log 2}(\text{matrixSize})][\text{Log 2}(\text{matrixSize})][k][1]$$

The value of ScalingMatrixRec[id][x][y] shall be greater than 0.

The scaling matrices, represented by the variable ScalingFactor[wId][hId][matrixId][x][y], are derived from the scaling list data. The wId and hId refer to the sizeID variable representing the size of the transform block. The sizeId and matrixId are given by the following tables:

TABLE 7-5

Association of scaling list ID and prediction mode and component

| max( nTbW, nTbH ) | | 2 | 4 | 8 | 16 | 32 | 64 |
|---|---|---|---|---|---|---|---|
| predMode = MODE_INTRA | cIdx = 0 (Y) | | 2 | 8 | 14 | 20 | 26 |
| | cIdx = 1 (Cb) | | 3 | 9 | 15 | 21 | 21 |
| | cIdx = 2 (Cr) | | 4 | 10 | 16 | 22 | 22 |
| predMode = MODE_INTER (INTER, IBC) | cIdx = 0 (Y) | | 5 | 11 | 17 | 23 | 27 |
| | cIdx = 1 (Cb) | 0 | 6 | 12 | 18 | 24 | 24 |
| | cIdx = 2 (Cr) | 1 | 7 | 13 | 19 | 25 | 25 |

Some notable features of the scaling matrices and their derivation are provided below:

Scaling matrices are specified separately for each of the three color components and two prediction types: inter-prediction and IBC are treated together as one type and intra prediction is treated as another type.

The scaling lists (and thus the derived matrices) are specified for the square transform blocks. For rectangular TBs, the scaling matrices are derived from the scaling matrix of a corresponding square TB.

For 16×16, 32×32 and 64×64 scaling matrices, only 64 coefficients are specified as an 8×8 grid, and the matrix coefficients for the larger blocks are obtained by upsampling the coefficients to the desired size. In such cases, a DC coefficient is also signaled.

Scaling lists are classified into three categories based on the size of the signaled scaling list:
- Category 1: scaling list with IDs 0 and 1; these lists have a size of 4 (2×2) coefficients
- Category 2: scaling list with IDs 2 to 7, inclusive; these lists have a size of 16 (4×4) coefficients
- Category 3: scaling list with IDs 8 to 27, inclusive; these lists have a size of 64 (8×8) coefficients A total of 28 scaling lists may be specified in a scaling list APS. Within each of the 3 categories, scaling lists may be predicted or copied from other scaling lists that have a smaller ID. For example, a scaling list with ID 5 (Category 2) may be predicted from any scaling list with ID 2 to 4, inclusive (also Category 2) but cannot be predicted from Category 1 and 3, or from scaling lists with IDs 6 and 7. The prediction may either be a copy (values of reference scaling list are used without change) or a delta-prediction (delta values are signaled to the values of the reference scaling matrix). When the DC coefficient is also signaled for a particular sizeID, the DC coefficient may also be copied or predicted from the DC coefficient of the reference scaling list or explicitly signaled.

Figure 3:
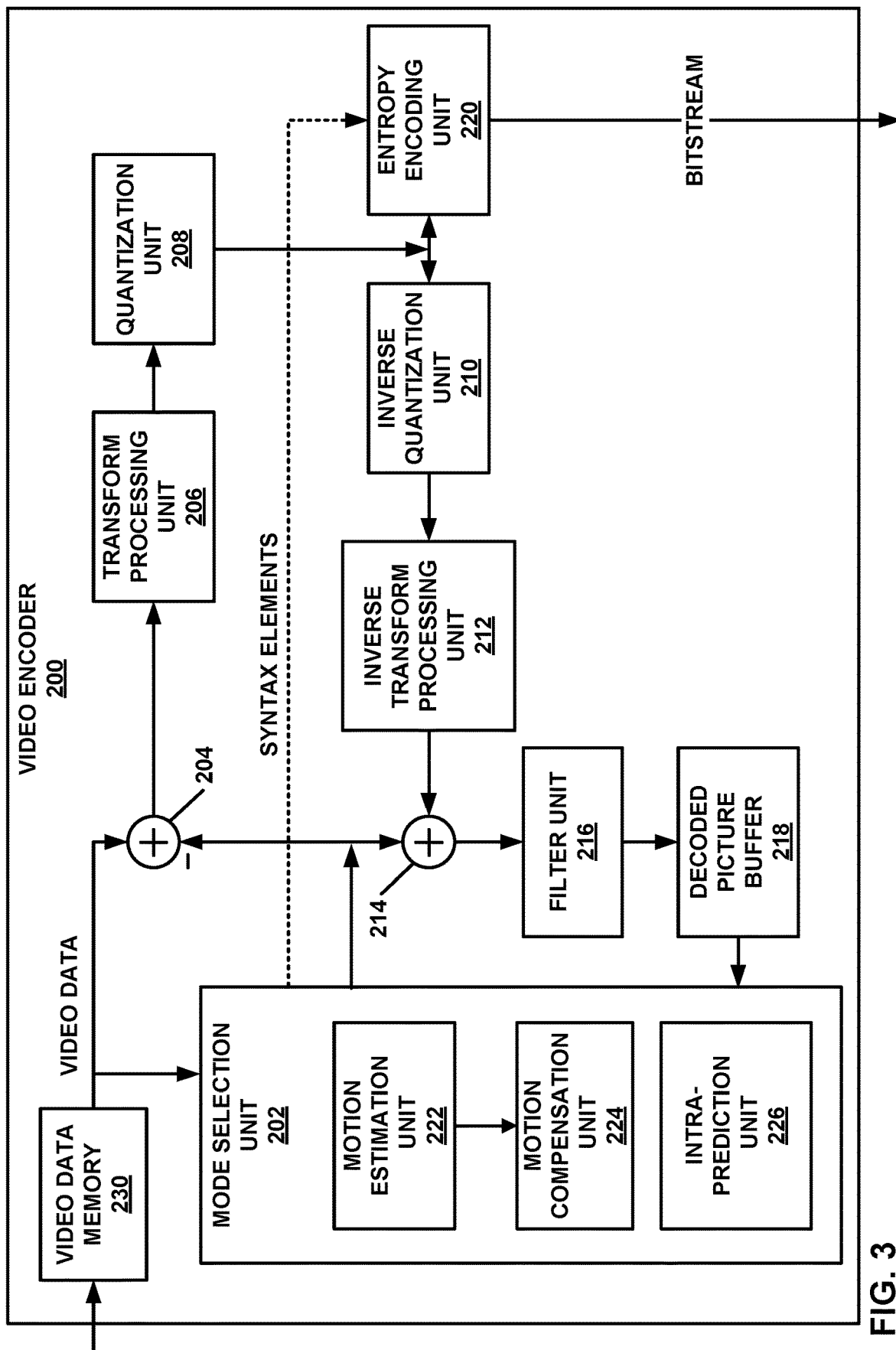
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to obtain a scaling list for adaptive color transform (ACT); encode, in a coded video bitstream, a syntax element specifying a set of block types to which the scaling list may be applied; and apply ACT to a block of video data having a block type included in the set of block types.

Video encoder 200 represents an example of a device configured to encode video data including a memory configured to store video data, and one or more processing units implemented in circuitry and configured to obtain a scaling list for low frequency non-separable transform (LFNST); encode, in a coded video bitstream, a syntax element specifying a set of block types to which the scaling list may be applied; and apply LFNST to a block of video data having a block type included in the set of block types.

Figure 4:
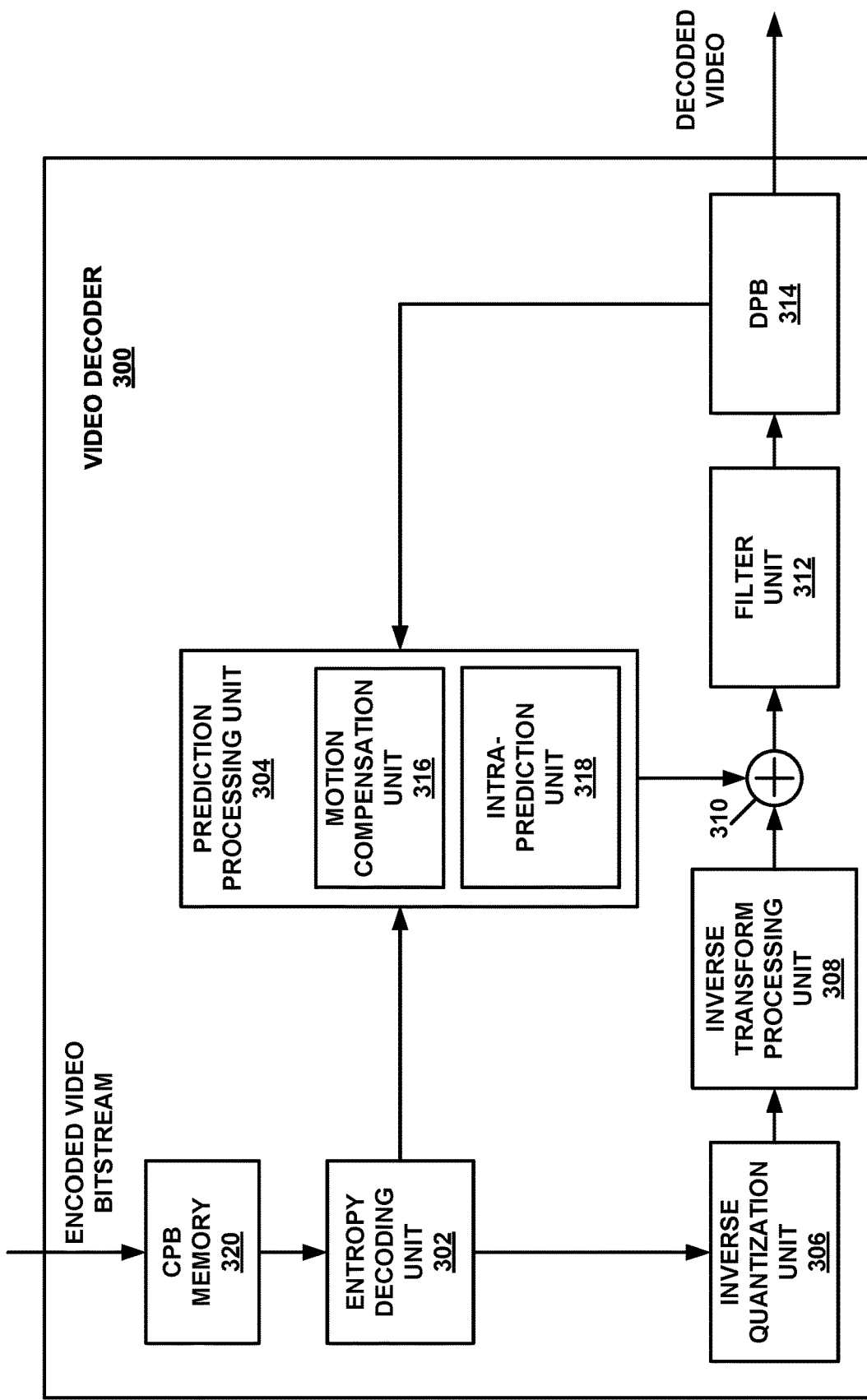
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to obtain a scaling list for adaptive color transform (ACT); decode, from a coded video bitstream, a syntax element specifying a set of block types to which the scaling list may be applied; and apply ACT to a block of video data having a block type included in the set of block types.

Video decoder 300 represents an example of a device configured to encode video data including a memory configured to store video data, and one or more processing units implemented in circuitry and configured to obtain a scaling list for low frequency non-separable transform (LFNST); decode, from a coded video bitstream, a syntax element specifying a set of block types to which the scaling list may be applied; and apply LFNST to a block of video data having a block type included in the set of block types.

Figure 5:
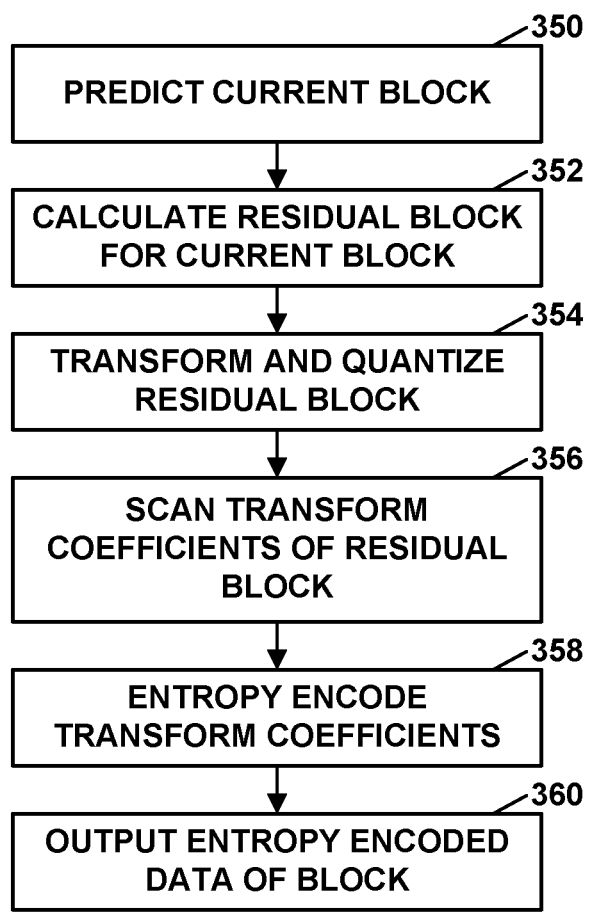
FIG. 5 is a flowchart illustrating an example method for encoding a current block.

FIG. 5 is a flowchart illustrating an example method for encoding a current block. The current block may comprise a current CU. Although described with respect to video encoder 200 (FIGS. 1 and 3), it should be understood that other devices may be configured to perform a method similar to that of FIG. 5.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 6:
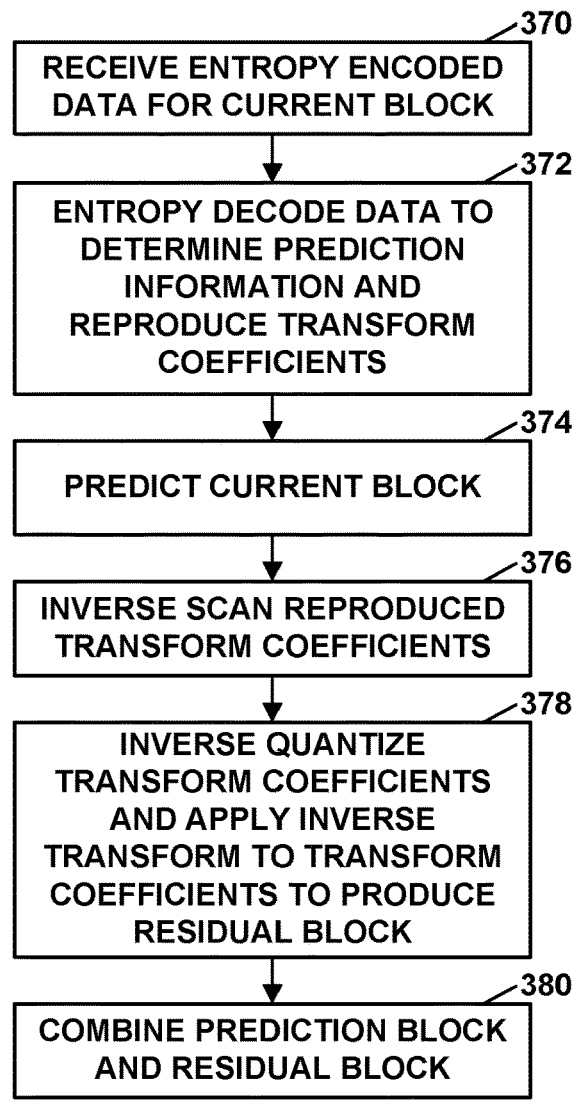
FIG. 6 is a flowchart illustrating an example method for decoding a current block.

FIG. 6 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 6.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 7:
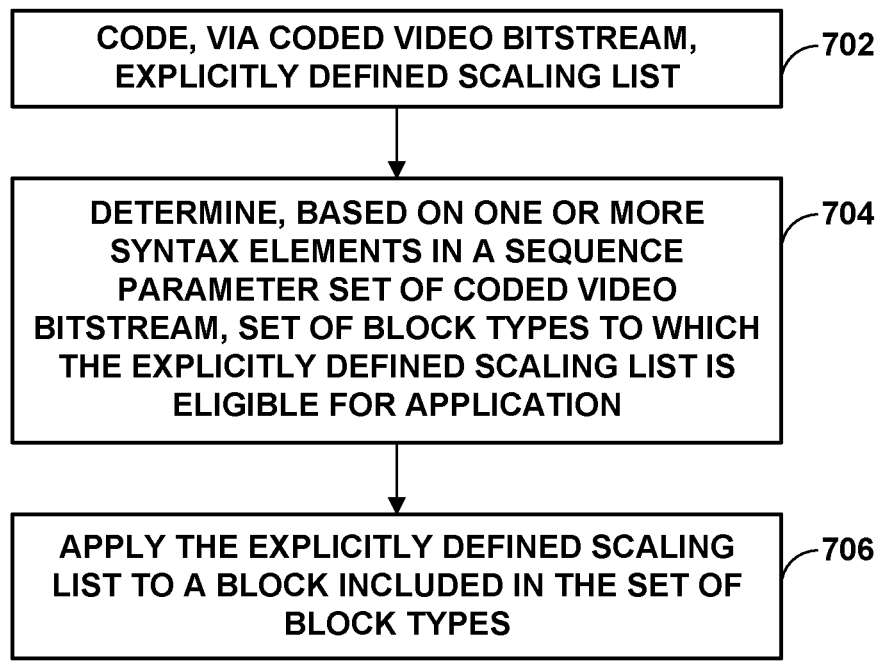
FIG. 7 is a flowchart illustrating an example method for adaptive scaling list control, in accordance with one or more techniques of this disclosure.

FIG. 7 is a flowchart illustrating an example method for adaptive scaling list control, in accordance with one or more techniques of this disclosure. Although described with respect to video decoder 300 (FIGS. 1 and 4), it should be understood that other devices may be configured to perform a method similar to that of FIG. 7. For instance, video encoder 200 (FIGS. 1 and 3) may be configured to perform a method similar to that of FIG. 7.

Video decoder 300 may decode, via a coded video bitstream, an explicitly defined scaling list (702). For instance, entropy decoding unit 302 may decode one or more syntax elements that represent a scaling list (e.g., scaling_list_pred_id_delta, scaling_list_dc_coef, scaling_list_delta_coef, etc.).

Video decoder 300 may determine, based on one or more syntax elements in a sequence parameter set (SPS) of the coded video bitstream, a set of block types to which the explicitly defined scaling list is eligible for application (704). For instance, entropy decoding unit 302 may decode one or more syntax elements (e.g., ScalingListType) and determine, based on values of the syntax elements, the set of block types. In some examples, the set of block types may include either ACT block types or other blocks (e.g., non-ACT block types). A block may be an ACT block type if adaptive color transform is applied to the block.

In some examples, the one or more syntax elements may include a first syntax element having a value that specifies whether or not ACT is enabled. Where the value of the first syntax element specifies that ACT is not enabled, video decoder 300 may determine that the set of block types does not include ACT block types. The one or more syntax elements may include a second syntax element having a value that specifies whether or not the set of block types includes blocks to which a color space conversion is applied (e.g., sps_scaling_matrix_for_alternative_colour_space_disabled_flag). As such, video decoder 300 may determine the set of block types to which the explicitly defined scaling list is eligible for application based on the second syntax element having a value that specifies whether or not the set of block types includes blocks to which a color space conversion.

Video decoder 300 may apply the explicitly defined scaling list to a block included in the set of block types (706). For instance, inverse quantization unit 306 may scale transform coefficients using the explicitly defined scaling list.

The following numbered clauses may illustrate one or more aspects of the disclosure:

Clause 1A. A method of coding video data, the method comprising: obtaining a scaling list for adaptive color transform (ACT); coding, via a coded video bitstream, a syntax element specifying a set of block types to which the scaling list may be applied; and applying ACT to a block of video data having a block type included in the set of block types.

Clause 2A. The method of clause 1A, wherein the syntax element comprises a ScalingListType syntax element.

Clause 3A. The method of clause 2A, further comprising: responsive to the syntax element having a first value, determining that the set of block types includes only ACT block types.

Clause 4A. The method of clause 2A or 3A, further comprising: responsive to the syntax element having a second value, determining that the set of block types includes ACT block types.

Clause 5A. The method of any of clauses 1A-4A, wherein applying ACT to the block comprises applying ACT to a plurality of blocks having a block type included in the set of block types.

Clause 6A. The method of any of clauses 1A-5A, wherein coding the syntax element comprises coding the syntax element in a sequence parameter set (SPS), a picture parameter set (PPS), a picture header (PH), a slice header (SH), or an adaptive parameter set (APS).

Clause 7A. A method comprising: obtaining a scaling list for low frequency non-separable transform (LFNST); coding, via a coded video bitstream, a syntax element specifying a set of block types to which the scaling list may be applied; and applying LFNST to a block of video data having a block type included in the set of block types.

Clause 8A. The method of clause 7A, wherein the syntax element comprises a ScalingListType syntax element.

Clause 9A. The method of clause 8A, further comprising: responsive to the syntax element having a first value, determining that the set of block types includes only adaptive color transform (ACT) block types.

Clause 10A. The method of clause 8A or 9A, further comprising: responsive to the syntax element having a second value, determining that the set of block types includes only LFNST block types.

Clause 11A. The method of clauses 8A-10A, further comprising: responsive to the syntax element having a third value, determining that the set of block types includes adaptive color transform (ACT) block types and does not include LFNST block types.

Clause 12A. The method of any of clauses 7A-11A, wherein applying LFNST to the block comprises applying LFNST to a plurality of blocks having a block type included in the set of block types.

Clause 13A. The method of any of clauses 7A-12A, wherein coding the syntax element comprises coding the syntax element in a sequence parameter set (SPS), a picture parameter set (PPS), a picture header (PH), a slice header (SH), or an adaptive parameter set (APS).

Clause 14A. The method of any of clauses 1A-13A, wherein coding comprises decoding.

Clause 15A. The method of any of clauses 1A-14A, wherein coding comprises encoding.

Clause 16A. A device for coding video data, the device comprising one or more means for performing the method of any of clauses 1A-15A.

Clause 17A. The device of claim 16A, wherein the one or more means comprise one or more processors implemented in circuitry.

Clause 18A. The device of any of clauses 16A and 17A, further comprising a memory to store the video data.

Clause 19A. The device of any of clauses 16A-18A, further comprising a display configured to display decoded video data.

Clause 20A. The device of any of clauses 16A-19A, wherein the device comprises one or more of a camera, a computer, a mobile device, a broadcast receiver device, or a set-top box.

Clause 21A. The device of any of clauses 16A-20A, wherein the device comprises a video decoder.

Clause 22A. The device of any of clauses 16A-21A, wherein the device comprises a video encoder.

Clause 23A. A computer-readable storage medium having stored thereon instructions that, when executed, cause one or more processors to perform the method of any of clauses 1A-15A.

Clause 1B. A method of decoding video data, the method comprising: decoding, from a coded video bitstream, an explicitly defined scaling list; determining, based on values of one or more syntax elements decoded from a sequence parameter set (SPS) of the coded video bitstream, a set of block types to which the explicitly defined scaling list is eligible for application; and applying the explicitly defined scaling list to a block included in the set of block types.

Clause 2B. The method of clause 1B, further comprising: not applying the explicitly defined scaling list to blocks not included in the set of block types.

Clause 3B. The method of clause 1B, wherein determining the set of block types comprises determining whether the set of block types includes adaptive color transform (ACT) block types.

Clause 4B. The method of clause 3B, wherein the one or more syntax elements include a first syntax element having a value that specifies whether or not ACT is enabled, wherein determining the set of block types comprises determining that the set of block types does not include ACT block types where ACT is not enabled.

Clause 5B. The method of clause 4B, wherein the one or more syntax elements include a second syntax element having a value that specifies whether or not the set of block types includes blocks to which a color space conversion is applied.

Clause 6B. A device for decoding video data, the device comprising: a memory configured to store at least a portion of a coded video bitstream; and one or more processors that are implemented in circuitry and configured to: decode, from the coded video bitstream, an explicitly defined scaling list; determine, based on values of one or more syntax elements decoded from a sequence parameter set (SPS) of the coded video bitstream, a set of block types to which the explicitly defined scaling list is eligible for application; and apply the explicitly defined scaling list to a block included in the set of block types.

Clause 7B. The device of clause 6B, wherein the one or more processors are configured to: not apply the explicitly defined scaling list to blocks not included in the set of block types.

Clause 8B. The device of clause 6B, wherein determining the set of block types comprises determining whether the set of block types includes adaptive color transform (ACT) block types.

Clause 9B. The device of clause 8B, wherein the one or more syntax elements include a first syntax element having a value that specifies whether or not ACT is enabled, wherein, to determine the set of block types, the one or more processors are configured to determine that the set of block types does not include ACT block types where ACT is not enabled.

Clause 10B. The device of clause 9B, wherein the one or more syntax elements include a second syntax element having a value that specifies whether or not the set of block types includes blocks to which a color space conversion is applied.

Clause 11B. A method of encoding video data, the method comprising: encoding, in a coded video bitstream, an explicitly defined scaling list; encoding, in a sequence parameter set (SPS) of the coded video bitstream, one or more syntax elements that specify a set of block types to which the explicitly defined scaling list is eligible for application; and applying the explicitly defined scaling list to a block included in the set of block types.

Clause 12B. The method of clause 11B, further comprising: not applying the explicitly defined scaling list to blocks not included in the set of block types.

Clause 13B. The method of clause 11B, wherein determining the set of block types comprises determining whether the set of block types includes adaptive color transform (ACT) block types.

Clause 14B. The method of clause 13B, wherein the one or more syntax elements include a first syntax element having a value that specifies whether or not ACT is enabled, wherein determining the set of block types comprises determining that the set of block types does not include ACT block types where ACT is not enabled.

Clause 15B. The method of clause 14B, wherein the one or more syntax elements include a second syntax element having a value that specifies whether or not the set of block types includes blocks to which a color space conversion is applied.

Clause 16B. A device for encoding video data, the device comprising: a memory configured to store at least a portion of a coded video bitstream; and one or more processors that are implemented in circuitry and configured to: encode, in the coded video bitstream, an explicitly defined scaling list; encode in a sequence parameter set (SPS) of the coded video bitstream, one or more syntax elements that specify a set of block types to which the explicitly defined scaling list is eligible for application; and apply the explicitly defined scaling list to a block included in the set of block types.

Clause 17B. The device of clause 16B, wherein the one or more processors are configured to: not apply the explicitly defined scaling list to blocks not included in the set of block types.

Clause 18B. The device of clause 16B, wherein determining the set of block types comprises determining whether the set of block types includes adaptive color transform (ACT) block types.

Clause 19B. The device of clause 18B, wherein the one or more syntax elements include a first syntax element having a value that specifies whether or not ACT is enabled, wherein, to determine the set of block types, the one or more processors are configured to determine that the set of block types does not include ACT block types where ACT is not enabled.

Clause 20B. The device of clause 19B, wherein the one or more syntax elements include a second syntax element having a value that specifies whether or not the set of block types includes blocks to which a color space conversion is applied.

Clause 21B. A device for decoding video data, the device comprising: means for decoding, from a coded video bitstream, an explicitly defined scaling list; means for determining, based on values of one or more syntax elements decoded from a sequence parameter set (SPS) of the coded video bitstream, a set of block types to which the explicitly defined scaling list is eligible for application; and means for applying the explicitly defined scaling list to a block included in the set of block types.

Clause 22B. A device for encoding video data, the device comprising: means for encoding, in a coded video bitstream, an explicitly defined scaling list; means for encoding, in a sequence parameter set (SPS) of the coded video bitstream, one or more syntax elements that specify a set of block types to which the explicitly defined scaling list is eligible for application; and means for applying the explicitly defined scaling list to a block included in the set of block types.

Clause 23B. A computer-readable storage medium storing instructions that, when executed, cause one or more processors to: decode, from a coded video bitstream, an explicitly defined scaling list; determine, based on values of one or more syntax elements decoded from a sequence parameter set (SPS) of the coded video bitstream, a set of block types to which the explicitly defined scaling list is eligible for application; and apply the explicitly defined scaling list to a block included in the set of block types.

Clause 24B. A computer-readable storage medium storing instructions that, when executed, cause one or more processors to: encode, in a coded video bitstream, an explicitly defined scaling list; encode in a sequence parameter set (SPS) of the coded video bitstream, one or more syntax elements that specify a set of block types to which the explicitly defined scaling list is eligible for application; and apply the explicitly defined scaling list to a block included in the set of block types.

Clause 1C. A method of decoding video data, the method comprising: decoding, from a coded video bitstream, an explicitly defined scaling list; determining, based on values of one or more syntax elements decoded from a sequence parameter set (SPS) of the coded video bitstream, a set of block types to which the explicitly defined scaling list is eligible for application; and applying the explicitly defined scaling list to a block included in the set of block types.

Clause 2C. The method of clause 1C, further comprising: not applying the explicitly defined scaling list to blocks not included in the set of block types.

Clause 3C. The method of clause 1C or 2C, wherein determining the set of block types comprises determining whether the set of block types includes adaptive color transform (ACT) block types.

Clause 4C. The method of clause 3C, wherein the one or more syntax elements include a first syntax element having a value that specifies whether or not ACT is enabled, wherein determining the set of block types comprises determining that the set of block types does not include ACT block types where ACT is not enabled.

Clause 5C. The method of clause 4C, wherein the one or more syntax elements include a second syntax element having a value that specifies whether or not the set of block types includes blocks to which a color space conversion is applied.

Clause 6C. A device for decoding video data, the device comprising: a memory configured to store at least a portion of a coded video bitstream; and one or more processors that are implemented in circuitry and configured to: decode, from the coded video bitstream, an explicitly defined scaling list; determine, based on values of one or more syntax elements decoded from a sequence parameter set (SPS) of the coded video bitstream, a set of block types to which the explicitly defined scaling list is eligible for application; and apply the explicitly defined scaling list to a block included in the set of block types.

Clause 7C. The device of clause 6C, wherein the one or more processors are configured to: not apply the explicitly defined scaling list to blocks not included in the set of block types.

Clause 8C. The device of clause 6C or 7C, wherein determining the set of block types comprises determining whether the set of block types includes adaptive color transform (ACT) block types.

Clause 9C. The device of clause 8C, wherein the one or more syntax elements include a first syntax element having a value that specifies whether or not ACT is enabled, wherein, to determine the set of block types, the one or more processors are configured to determine that the set of block types does not include ACT block types where ACT is not enabled.

Clause 10C. The device of clause 9C, wherein the one or more syntax elements include a second syntax element having a value that specifies whether or not the set of block types includes blocks to which a color space conversion is applied.

Clause 11C. A method of encoding video data, the method comprising: encoding, in a coded video bitstream, an explicitly defined scaling list; encoding, in a sequence parameter set (SPS) of the coded video bitstream, one or more syntax elements that specify a set of block types to which the explicitly defined scaling list is eligible for application; and applying the explicitly defined scaling list to a block included in the set of block types.

Clause 12C. The method of clause 11C, further comprising: not applying the explicitly defined scaling list to blocks not included in the set of block types.

Clause 13C. The method of clause 11C or 12C, wherein determining the set of block types comprises determining whether the set of block types includes adaptive color transform (ACT) block types.

Clause 14C. The method of clause 13C, wherein the one or more syntax elements include a first syntax element having a value that specifies whether or not ACT is enabled, wherein determining the set of block types comprises determining that the set of block types does not include ACT block types where ACT is not enabled.

Clause 15C. The method of clause 14C, wherein the one or more syntax elements include a second syntax element having a value that specifies whether or not the set of block types includes blocks to which a color space conversion is applied.

Clause 16C. A device for encoding video data, the device comprising: a memory configured to store at least a portion of a coded video bitstream; and one or more processors that are implemented in circuitry and configured to: encode, in the coded video bitstream, an explicitly defined scaling list; encode in a sequence parameter set (SPS) of the coded video bitstream, one or more syntax elements that specify a set of block types to which the explicitly defined scaling list is eligible for application; and apply the explicitly defined scaling list to a block included in the set of block types.

Clause 17C. The device of clause 16C, wherein the one or more processors are configured to: not apply the explicitly defined scaling list to blocks not included in the set of block types.

Clause 18C. The device of clause 16C or 17C, wherein determining the set of block types comprises determining whether the set of block types includes adaptive color transform (ACT) block types.

Clause 19C. The device of clause 18C, wherein the one or more syntax elements include a first syntax element having a value that specifies whether or not ACT is enabled, wherein, to determine the set of block types, the one or more processors are configured to determine that the set of block types does not include ACT block types where ACT is not enabled.

Clause 20C. The device of clause 19C, wherein the one or more syntax elements include a second syntax element having a value that specifies whether or not the set of block types includes blocks to which a color space conversion is applied.

Clause 21C. A device for decoding video data, the device comprising: means for decoding, from a coded video bitstream, an explicitly defined scaling list; means for determining, based on values of one or more syntax elements decoded from a sequence parameter set (SPS) of the coded video bitstream, a set of block types to which the explicitly defined scaling list is eligible for application; and means for applying the explicitly defined scaling list to a block included in the set of block types.

Clause 22C. A device for encoding video data, the device comprising: means for encoding, in a coded video bitstream, an explicitly defined scaling list; means for encoding, in a sequence parameter set (SPS) of the coded video bitstream, one or more syntax elements that specify a set of block types to which the explicitly defined scaling list is eligible for application; and means for applying the explicitly defined scaling list to a block included in the set of block types.

Clause 23C. A computer-readable storage medium storing instructions that, when executed, cause one or more processors to: decode, from a coded video bitstream, an explicitly defined scaling list; determine, based on values of one or more syntax elements decoded from a sequence parameter set (SPS) of the coded video bitstream, a set of block types to which the explicitly defined scaling list is eligible for application; and apply the explicitly defined scaling list to a block included in the set of block types.

Clause 24C. A computer-readable storage medium storing instructions that, when executed, cause one or more processors to: encode, in a coded video bitstream, an explicitly defined scaling list; encode in a sequence parameter set (SPS) of the coded video bitstream, one or more syntax elements that specify a set of block types to which the explicitly defined scaling list is eligible for application; and apply the explicitly defined scaling list to a block included in the set of block types.

Clause 1D. Any combination of clauses 1A-24C.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    decoding, from a coded video bitstream, an explicitly defined scaling list;
    determining, based on values of one or more syntax elements decoded from a sequence parameter set (SPS) of the coded video bitstream, a set of block types to which the explicitly defined scaling list is eligible for application; and
    applying the explicitly defined scaling list to a block included in the set of block types.

2. The method of claim 1, further comprising:
    not applying the explicitly defined scaling list to blocks not included in the set of block types.

3. The method of claim 1, wherein determining the set of block types comprises determining whether the set of block types includes adaptive color transform (ACT) block types.

4. The method of claim 3, wherein the one or more syntax elements include a first syntax element having a value that specifies whether or not ACT is enabled, wherein determining the set of block types comprises determining that the set of block types does not include ACT block types where ACT is not enabled.

5. The method of claim 4, wherein the one or more syntax elements include a second syntax element having a value that specifies whether or not the set of block types includes blocks to which a color space conversion is applied.

6. A device for decoding video data, the device comprising:
    a memory configured to store at least a portion of a coded video bitstream; and
    one or more processors that are implemented in circuitry and configured to:
        decode, from the coded video bitstream, an explicitly defined scaling list;
        determine, based on values of one or more syntax elements decoded from a sequence parameter set (SPS) of the coded video bitstream, a set of block types to which the explicitly defined scaling list is eligible for application; and
        apply the explicitly defined scaling list to a block included in the set of block types.

7. The device of claim 6, wherein the one or more processors are configured to:
    not apply the explicitly defined scaling list to blocks not included in the set of block types.

8. The device of claim 6, wherein determining the set of block types comprises determining whether the set of block types includes adaptive color transform (ACT) block types.

9. The device of claim 8, wherein the one or more syntax elements include a first syntax element having a value that specifies whether or not ACT is enabled, wherein, to determine the set of block types, the one or more processors are configured to determine that the set of block types does not include ACT block types where ACT is not enabled.

10. The device of claim 9, wherein the one or more syntax elements include a second syntax element having a value that specifies whether or not the set of block types includes blocks to which a color space conversion is applied.

11. A method of encoding video data, the method comprising:
    encoding, in a coded video bitstream, an explicitly defined scaling list;
    encoding, in a sequence parameter set (SPS) of the coded video bitstream, one or more syntax elements that specify a set of block types to which the explicitly defined scaling list is eligible for application; and
    applying the explicitly defined scaling list to a block included in the set of block types.

12. The method of claim 11, further comprising:
    not applying the explicitly defined scaling list to blocks not included in the set of block types.

13. The method of claim 11, wherein determining the set of block types comprises determining whether the set of block types includes adaptive color transform (ACT) block types.

14. The method of claim 13, wherein the one or more syntax elements include a first syntax element having a value that specifies whether or not ACT is enabled, wherein determining the set of block types comprises determining that the set of block types does not include ACT block types where ACT is not enabled.

15. The method of claim 14, wherein the one or more syntax elements include a second syntax element having a value that specifies whether or not the set of block types includes blocks to which a color space conversion is applied.

16. A device for encoding video data, the device comprising:
a memory configured to store at least a portion of a coded video bitstream; and
one or more processors that are implemented in circuitry and configured to:
encode, in the coded video bitstream, an explicitly defined scaling list;
encode in a sequence parameter set (SPS) of the coded video bitstream, one or more syntax elements that specify a set of block types to which the explicitly defined scaling list is eligible for application; and
apply the explicitly defined scaling list to a block included in the set of block types.

17. The device of claim 16, wherein the one or more processors are configured to:
not apply the explicitly defined scaling list to blocks not included in the set of block types.

18. The device of claim 16, wherein determining the set of block types comprises determining whether the set of block types includes adaptive color transform (ACT) block types.

19. The device of claim 18, wherein the one or more syntax elements include a first syntax element having a value that specifies whether or not ACT is enabled, wherein, to determine the set of block types, the one or more processors are configured to determine that the set of block types does not include ACT block types where ACT is not enabled.

20. The device of claim 19, wherein the one or more syntax elements include a second syntax element having a value that specifies whether or not the set of block types includes blocks to which a color space conversion is applied.

21. A device for decoding video data, the device comprising:
means for decoding, from a coded video bitstream, an explicitly defined scaling list;
means for determining, based on values of one or more syntax elements decoded from a sequence parameter set (SPS) of the coded video bitstream, a set of block types to which the explicitly defined scaling list is eligible for application; and
means for applying the explicitly defined scaling list to a block included in the set of block types.

22. A device for encoding video data, the device comprising:
means for encoding, in a coded video bitstream, an explicitly defined scaling list;
means for encoding, in a sequence parameter set (SPS) of the coded video bitstream, one or more syntax elements that specify a set of block types to which the explicitly defined scaling list is eligible for application; and
means for applying the explicitly defined scaling list to a block included in the set of block types.

23. A computer-readable storage medium storing instructions that, when executed, cause one or more processors to:
decode, from a coded video bitstream, an explicitly defined scaling list;
determine, based on values of one or more syntax elements decoded from a sequence parameter set (SPS) of the coded video bitstream, a set of block types to which the explicitly defined scaling list is eligible for application; and
apply the explicitly defined scaling list to a block included in the set of block types.

24. A computer-readable storage medium storing instructions that, when executed, cause one or more processors to:
encode, in a coded video bitstream, an explicitly defined scaling list;
encode in a sequence parameter set (SPS) of the coded video bitstream, one or more syntax elements that specify a set of block types to which the explicitly defined scaling list is eligible for application; and
apply the explicitly defined scaling list to a block included in the set of block types.

* * * * *